US012781037B2

(12) United States Patent
Lee et al.

(10) Patent No.: US 12,781,037 B2
(45) Date of Patent: Nov. 3, 2026

(54) COMPOSITION, POLYMER PREPARED THEREFROM, AND ELECTRONIC APPARATUS INCLUDING THE SAME

(71) Applicant: Samsung Display Co., Ltd., Yongin-si (KR)

(72) Inventors: Sebeen Lee, Yongin-si (KR); Bookan Ki, Yongin-si (KR); Hoyun Byun, Yongin-si (KR); Intae Son, Yongin-si (KR); Donghyeon Lee, Yongin-si (KR); Jeongin Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 759 days.

(21) Appl. No.: 18/162,745

(22) Filed: Feb. 1, 2023

(65) Prior Publication Data

US 2023/0357557 A1 Nov. 9, 2023

(30) Foreign Application Priority Data

May 9, 2022 (KR) ........................ 10-2022-0056874

(51) Int. Cl.

*C08L 33/12* (2006.01)
*C08F 20/26* (2006.01)
*C08K 5/541* (2006.01)
*C08L 23/14* (2006.01)

(52) U.S. Cl.

CPC .............. *C08L 33/12* (2013.01); *C08K 5/541* (2013.01); *C08L 23/14* (2013.01); *C08L 2203/16* (2013.01); *C08L 2203/20* (2013.01)

(58) Field of Classification Search

CPC .......... C08F 20/26; C08F 20/28; C08F 20/30; C08F 20/32

USPC .......................................................... 526/266

See application file for complete search history.

(56) References Cited

U.S. PATENT DOCUMENTS 8,742,411 B2 6/2014 Yoo et al.
9,182,527 B2 * 11/2015 Kobayashi ........... C08G 18/755

FOREIGN PATENT DOCUMENTS

| | | | |
|---|---|---|---|
| JP | 2014105263 | A | 6/2014 |
| JP | 2016181370 | A | 10/2016 |
| JP | 2017179180 | A | 10/2017 |
| KR | 101771776 | B1 | 8/2017 |
| KR | 102025865 | B1 | 9/2019 |
| KR | 102092018 | B1 | 3/2020 |
| KR | 10-20210090235 | A | 7/2021 |

OTHER PUBLICATIONS

Seung-Suk Baek, et al., Preparation of Acrylic Pressure Sensitive Adhesives for Optical Applications and Their Adhesion Performance, Polymer Korea, 38, 2, 199-204 (2014).

* cited by examiner

*Primary Examiner* — Vickey Nerangis

(74) *Attorney, Agent, or Firm* — CANTOR COLBURN LLP

(57) ABSTRACT

A composition including a first monomer including a hydroxy group, a second monomer that does not include a hydroxy group, a third monomer including a terminal heterocyclic group, a fourth monomer including an alkylene glycol, an oligomer, a silane coupling agent, and a photoinitiator. The composition has a viscosity of 5 centipoise to 50 centipoise at about room temperature.

17 Claims, No Drawings

COMPOSITION, POLYMER PREPARED THEREFROM, AND ELECTRONIC APPARATUS INCLUDING THE SAME

CROSS-REFERENCE TO RELATED APPLICATION

This application claims priority to Korean Patent Application No. 10-2022-0056874, filed on May 9, 2022, in the Korean Intellectual Property Office, and all the benefits accruing therefrom under 35 USC § 119, the disclosure of which is herein incorporated by reference in its entirety.

BACKGROUND

1. Field

One or more embodiments relate to a composition, a polymer prepared from the composition, and an electronic apparatus including the polymer.

2. Description of the Related Art

An optically clear adhesive (OCA) is used to promote adhesion between a film, a panel, and a window of a foldable display with an objective at providing module flexibility and reducing stress relief during repeated folding of the foldable display.

However, it is known that the use or presence of an OCA may present many technical issues during production of displays, particularly, foldable displays. For example, OCAs need to be precisely and accurately cut to fit the adhesive onto films to which they are to be attached and this significantly adds to the production cost of such displays. Accordingly, there is a need to develop an OCA that can be added onto a film in a more facile manner that not only reduces production costs but maintains high adherence performance of the OCA.

SUMMARY

One or more embodiments include a composition for the preparation of a polymer film of a variety of shapes, a polymer formed by polymerizing the composition, and an electronic apparatus, e.g., a display apparatus, including the polymer.

Additional aspects will be set forth in part in the description which follows and, in part, will be apparent from the description, or may be learned by practice of the presented embodiments of the disclosure.

According to one or more embodiments, a composition includes a first monomer including a hydroxy group, a second monomer that does not include a hydroxy group, a third monomer including a terminal heterocyclic group, a fourth monomer including an alkylene glycol group, an oligomer, a silane coupling agent, and a photoinitiator, wherein the composition has a viscosity of 5 centipoise to 50 centipoise at room temperature. The composition provides a capability for application by inkjet-printing at about room temperature.

According to one or more embodiments, a polymer is formed by polymerizing the composition, and the resulting polymer has a modulus (G') at −20° C. of 0.13 Megapascals or less, and the polymer adheres a window to a film.

According to one or more embodiments, an electronic apparatus includes a window/polymer film/lower film structure, wherein the polymer film is a polymer film formed by polymerizing the composition.

DETAILED DESCRIPTION

Reference will now be made in detail to embodiments, which may have different forms and should not be construed as being limited to the descriptions set forth herein. As such, the embodiments are merely described below explain aspects of the present description.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or ±5% of the stated value.

As used herein, the term "(meth)acryl" is inclusive of both acryl and methacryl groups.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An optically clear adhesive (OCA) used in a foldable display can significantly increase production costs as one must precisely and accurately cut the adhesive so as to appropriately fit a film, i.e., an adhesion target.

The composition according to an aspect of the disclosure may include a first monomer including a hydroxy group, a second monomer that does not include a hydroxy group, a third monomer including a terminal heterocyclic group, a fourth monomer including an alkylene glycol group, an oligomer, a silane coupling agent, and a photoinitiator. The first, second, third, and fourth monomers may be crosslinkable monomers. The composition may have a viscosity of 5 centipoise (cP) to 50 centipoise at about room temperature that provides for inkjet-printing of the composition at about room temperature.

The composition according to an embodiment may have a viscosity to provide for inkjet-printing at room temperature, thereby, eliminating a need for cutting a pressure-sensitive adhesive film in advance to fit a film to be adhered to an adhesive target member. The composition according to an embodiment may be applied as a film by an inkjet process, and therefore the adhesive can be accurately and precisely printed to have any shape in accordance with the shape of a film.

According to an embodiment, the viscosity of the composition may be from 5 cP to 50 cP at about room temperature. For example, the viscosity of the composition may be 7 cP to 15 cP at about room temperature. When the viscosity of the composition is less than 5 cP, defects may occur during inkjet ejection (printing) at high speed. When the viscosity of the composition exceeds 50 cP at about room temperature, inkjet ejection (printing) may be more difficult to achieve with the composition.

According to an embodiment, the −20° C. modulus value of the polymer produced by the polymerization, which will include a crosslinking of the composition may be 0.09 Megapascals (MPa) to 0.13 MPa. When the −20° C. modulus value of the polymer is within the range, folding reliability of the polymer adhesive at extremely low temperatures may be obtained.

According to an embodiment, the 60° C. modulus value of the polymer produced by the polymerization (or crosslinking) process of the composition (hereinafter, the "crosslinked polymer") may be 0.025 MPa to 0.070 MPa. When the 60° C. modulus value of the crosslinked polymer is within the range, a folding test for a foldable display at a relatively high temperature and high humidity environment is shown to provide acceptable operational results.

According to an embodiment, in a repeated creep/recovery test at −20° C. for the crosslinked polymer, the strain may be 4.0 percent (%) or less.

In the repeated creep/recovery test, a shear force of 2000 pascals (Pa) is applied to the crosslinked polymer at −20° C. for 1 second, and then, the polymer is allowed to recover for 1 second. The strain is measured by the application of shear force followed by recovery of the polymer for 1 second, and the force/recovery cycle is repeated 300 times for a total of 600 seconds.

For example, in a repeated creep/recovery test at −20° C. for a crosslinked polymer the strain may be 1.0% to 4.0%.

According to an embodiment, in a repeated creep/recovery test at −60° C. of the crosslinked polymer, the strain may be 0.2% or less.

Likewise, in the repeated creep/recovery test, a shear force of 2000 Pa is applied to the crosslinked polymer at 60° C. for 1 second, and then, the polymer is allowed to recover for 1 second. The strain is measured by the application of the shear force followed by recovery of the polymer for 1 second, and the force/recovery cycle is repeated 300 times for a total of 600 seconds.

For example, in a repeated creep/recovery test at 60° C. of a crosslinked polymer the strain may be 0.05% to 0.2%.

In the repeated creep/recovery test, a shear force is applied to the polymer for a certain period of time (for example, 1 second), and after the applied shear force is removed, the polymer is allowed to recover for a certain period of time (for example, 1 second), and this cycle of applied shear force followed by recovery is repeated (for example, 300 times), and then the strain of the polymer is measured. The repeated creep/recovery test is well known to person of ordinary skill in the art and can be measured using a common rheometer. Accordingly, for brevity, additional technical details regarding the repeated creep/recovery test are not described herein.

When the strain is within this range following the creep/recovery test at −20° C. and 60° C., good results may be obtained in the folding test for a foldable display that is designed for use in a low-temperature, high-temperature and/or high-humidity environment.

According to an embodiment, the first monomer, or first crosslinkable monomer, including a hydroxy group may be a (meth)acrylate-based, i.e., a (meth)acrylate-containing monomer.

For example, the first monomer may be 4-hydroxybutyl (meth)acrylate, 2-hydroxypropyl(meth)acrylate, 2-hydroxyethyl(meth)acrylate, dihydroxyhexyl(meth)acrylate, or any combination thereof.

According to an embodiment, the second monomer that does not include OH may be a (meth)acrylate-containing monomer.

For example, the second monomer, or second crosslinkable monomer, may be 2-ethylhexyl(meth)acrylate, ethyl (meth)acrylate, methyl(meth)acrylate, n-propyl(meth)acrylate, isopropyl(meth)acrylate, pentyl(meth)acrylate, n-octyl (meth)acrylate, isooctyl(meth)acrylate, isononyl(meth) acrylate, n-butyl(meth)acrylate, isobutyl(meth)acrylate, n-hexyl(meth)acrylate, n-nonyl(meth)acrylate, isoamyl (meth)acrylate, n-decyl(meth)acrylate, isodecyl(meth)acrylate, dodecyl(meth)acrylate, isobornyl(meth)acrylate, cyclohexyl(meth)acrylate, phenyl(meth)acrylate, benzyl(meth) acrylate, isostearyl(meth)acrylate, 2-methylbutyl(meth) acrylate, or any combination thereof.

According to an embodiment, the third monomer, or crosslinkable monomer, including a terminal heterocyclic group may be a (meth)acrylate-containing monomer, for example an acrylate-containing monomer.

The heterocyclic group may be, for example, a $C_1$-$C_{10}$ heterocycloalkyl group or a $C_1$-$C_{10}$ heterocycloalkenyl group. The $C_1$-$C_{10}$ heterocycloalkyl group refers to a monovalent $C_1$ to $C_{10}$ cyclic group that has at least one hetero atom as a ring-forming atom in addition to a carbon atom. The heteroatom may be N, O, S, P, or Si are exemplary heteroatoms, and is not limited to this provided list. The $C_1$-$C_{10}$ heterocycloalkenyl group refers to a monovalent $C_1$ to $C_{10}$ cyclic group that has at least one hetero atom as a ring-forming atom in addition to a carbon atom, and that has at least one double bond inside the cycle.

For example, a third monomer including a terminal heterocyclic group may include tetrahydrofurfuryl(meth)acrylate, (tetrahydro-2H-pyran-2-yl)methyl(meth)acrylate, (oxetan-2-yl)methyl(meth)acrylate, (oxepan-2-yl)methyl (meth)acrylate, (2-oxa-bicyclo[2.2.2]octan-6-yl)methyl (meth)acrylate, (7-oxa-bicyclo[2.2.1]heptan-2-yl)methyl (meth)acrylate, or any combination thereof.

According to an embodiment, the fourth monomer, or fourth crosslinkable monomer, including an alkylene glycol group may be a (meth)acrylate-containing monomer. The fourth monomer may be a (C2 to C6 alkylene, or C2 to C3 alkylene) (methacrylate-containing monomer, optionally further including a C1 to 6 alkyl group, or a C1 to C4 alkyl group.

For example, the fourth monomer including an alkylene glycol group may include 2-ethylhexyl diglycol(meth)acrylate, ethylene glycol(meth)acrylate, propylene glycol(meth) acrylate, or any combination thereof.

According to an embodiment, the oligomer may include a first polypropylene glycol and a second polypropylene glycol, and the weight average molecular weight of the first polypropylene glycol may be different from the weight average molecular weight of the second polypropylene glycol.

For example, the weight average molecular weight of the first polypropylene glycol may be 5,000 to 20,000 grams per mole (g/mol). In an embodiment, the weight average molecular weight of the second polypropylene glycol may be 21,000 to 37,000 g/mol.

In regard to the composition, when the oligomer includes a first polypropylene glycol and a second polypropylene glycol of which weight average molecular weights are different from each other, the weight average molecular weight of the first polypropylene glycol is 5,000 to 20,000 g/mol, and the weight average molecular weight of the second polypropylene glycol is 21,000 to 37,000 g/mol, a foldable display exhibits acceptable adhesion following a folding test in a high temperature and high humidity environment.

The composition further includes a silane coupling agent, and upon forming the crosslinked polymer provides acceptable peel test results in a high temperature and high humidity environment may be excellent.

According to an embodiment, the silane coupling agent may include γ-glycidoxypropyltriethoxysilane, γ-glycidoxypropyltrimethoxysilane, γ-glycidoxypropylmethyldiethoxysilane, γ-glycidoxypropylmethyl dimethoxysilane, 3-chloropropyltrimethoxysilane, 3-chloropropyltriethoxysilane, 2-chloroethyltrimethoxysilane, 2-chloroethyltriethoxysilane, γ-methacryloxypropyl trimethoxysilane, γ-methacryloxypropyl methyldimethoxysilane, γ-methacryloxypropyl dimethylmethoxysilane, or any combination thereof.

The composition may include a photoinitiator that initiates polymerization by light, and the photoinitiator may be any compound that initiates polymerization by light, for example, ultraviolet (UV) light.

According to an embodiment, the photoinitiator may include 4-acryloxybenzophenone, 2,2-dimethoxy-2-phenylacetophenone, 2-hydroxy-2-methyl-1-phenyl-1-propan-1-one, ethyl(2,4,6-trimethylbenzoyl)phenyl phosphinate [ethyl(2,4,6-trimethylbenzoyl)phosphinate], bisacylphosphine oxide [bisacylphosphine oxide], or any combination thereof.

According to an embodiment, the first monomer is present from 5 weight percent (wt %) to 15 wt %, and the second monomer is present from 45 wt % to 65 wt %, based on the total solid content of the composition.

According to an embodiment, the amounts of the first monomer to the fourth monomer, the oligomer, the silane coupling agent and the photoinitiator in the composition may be as follows:

the first monomer: 5 wt % to 15 wt %,
the second monomer: 45 wt % to 65 wt %,
the third monomer: 10 wt % to 20 wt %,
the fourth monomer: 5 wt % to 15 wt %,
the oligomer: 2 wt % to 30 wt %,
the silane coupling agent: 0.1 wt % to 1 wt %, and
the photoinitiator: 0.001 wt % to 0.05 wt %, based on the total solid content of the composition.

According to an embodiment, the amounts of the first monomer to the fourth monomer, the oligomer, the silane coupling agent and the photoinitiator in the composition may be as follows:

the first monomer: 6 wt % to 10 wt %,
the second monomer: 47 wt % to 60 wt %,
the third monomer: 12 wt % to 19 wt %,
the fourth monomer: 8 wt % to 14 wt %,
the oligomer: 4 wt % to 20 wt %,
the silane coupling agent: 0.1 wt % to 1 wt %, and
the photoinitiator: 0.001 wt % to 0.05 wt %.

When the amount of the second monomer is within this range, the composition according to an embodiment may have a viscosity that allows for the composition to be applied by an inkjet-printing process.

Because the composition according to an embodiment includes the third monomer, folding reliability of the resulting crosslinked polymer in a high temperature and high humidity environment may be obtained. When the amount of the third monomer exceeds 20 wt %, peel strength of the resulting crosslinked polymer may decrease or be reduced. When the amount of the third monomer is less than 10 wt %, folding reliability of the resulting crosslinked polymer in a high temperature and high humidity environment may be unacceptable.

Because the composition according to an embodiment of includes the fourth monomer, the resulting crosslinked polymer may exhibit a low-temperature modulus that may be controlled. When the amount of the fourth monomer is less than 5 wt %, the resulting crosslinked polymer may exhibit a low-temperature modulus that may not be controlled. On the other hand, when the amount of the fourth monomer exceeds 15 wt %, peel strength of the resulting crosslinked polymer may be reduced.

Because the composition according to an embodiment includes the silane coupling agent, the peel strength of the resulting crosslinked polymer may increase or may be enhanced. Even when the amount of the silane coupling agent is small, e.g., less than 0.5 wt % or less than 0.3 wt %, the peel strength of the resulting crosslinked polymer may be enhanced.

The photoinitiator is a compound that starts the process of polymerizing the composition according to an embodiment using light, and the amount of the photoinitiator may be an amount thereof used for general photopolymerization of the polymer. The amount of the photoinitiator may be, for example, 0.001 wt % to 0.05 wt %.

The amounts of first monomer to fourth monomer, oligomer, a silane coupling agent, and photoinitiator in the composition may be based on 100 wt % of the total solid content of the composition.

According to an embodiment, the composition may not include a solvent.

According to an embodiment, the composition may include a solvent. The solvent used may be a generally used organic solvent, and may be selected from, for example, alkanes, alcohols, ethers, esters, and the like. The solvent may be, for example, methylene chloride. If present, the solvent is not included in the stated weight percent of the composition components.

According to an embodiment, the oligomer may include a first polypropylene glycol and a second polypropylene glycol, of which molecular weights are different from each other, and the weight ratio of the first polypropylene glycol to the second polypropylene glycol may be 1:9 to 9:1. For example, the weight ratio of the first polypropylene glycol and the second polypropylene glycol may be 3:7 to 7:3. For example, the weight ratio of the first polypropylene glycol and the second polypropylene glycol may be 4:6 to 6:4.

According to an embodiment, the composition may be used for adhering a window and a film to each other. For example, the composition may be used for adhering a film and a window of a foldable display to each other. The film may be, for example, a polarizing film.

For example, the composition is applied to a thickness of 0.1 mm to 0.5 mm on a film to be adhered and then cured (photopolymerized), a window of the foldable display is adhered thereto and again cured, whereby the window and the film can be attached to each other.

According to an embodiment, the crosslinking process may be performed by light. For example, the crosslinking process may be performed by UV light. For example, the crosslinking process may be performed using UV light having a wavelength of 10 nanometers (nm) to 400 nm. For example, the crosslinking process may be performed by extreme ultraviolet rays having a wavelength of 10 nm to 121 nm. For example, the crosslinking process may be performed by vacuum ultraviolet rays having a wavelength of 10 nm to 200 nm. For example, the crosslinking process may be performed using hydrogen Lyman alpha rays having a wavelength of 121 nm to 122 nm. For example, the crosslinking process may be performed by far ultraviolet rays having a wavelength of 122 nm to 200 nm. For example, the crosslinking process may be performed by mid-ultraviolet rays having a wavelength of 200 nm to 300 nm. For example, the crosslinking process may be performed by near-ultraviolet rays having a wavelength of 300 nm to 400 nm. For example, the crosslinking process may be performed by ultraviolet (UV) C having a wavelength of 100 nm to 280 nm. For example, the crosslinking process may be performed by ultraviolet B having a wavelength of 280 nm to 315 nm. For example, the crosslinking process may be performed by ultraviolet A having a wavelength of 315 nm to 400 nm.

For example, the composition is inkjet-printed to a thickness of 0.1 mm to 0.5 mm on a first arbitrary film, and a first cross-linking using UV light having the wavelength of 10 nm to 400 nm is performed for 0.1 seconds to 4 seconds, and then a second arbitrary film is adhered to a polymer formed by the first cross-linking, and then a second cross-linking using UV light having the wavelength of 10 nm to 400 nm is performed for 0.1 seconds to 4 seconds, thereby adhering the first arbitrary film to the second arbitrary film.

For example, the composition is inkjet-printed on a window, and a first cross-linking is performed for 0.1 seconds to 4 seconds using UV light of a wavelength of 10 nm to 400 nm, and a lower film is adhered to a polymer formed by first cross-linking. Thereafter, a second cross-linking is performed for 0.1 seconds to 4 seconds using UV light having a wavelength of 10 nm to 400 nm. By doing so, the resulting polymer can adhere the lower film to the window.

Hereinafter, for example, the composition, manufacturing method, and polymer film of the disclosure will be described in detail.

Example

Composition Preparation

Composition 1

24.6 wt % of 4-hydroxybutyl acrylate, 63.9 wt % of 2-ethylhexyl acrylate, 0.2 wt % of 1,9-nonanediol diacrylate, 2.5 wt % of first polypropylene glycol (Mn 10,000, Tg=−44° C.), 7.4 wt % of second polypropylene glycol (Mn 38,000, T=−6° C.), and 0.01 wt % of ethyl(2,4,6-trimethylbenzoyl)phenylphosphinate as a photoinitiator were mixed, and methylene chloride was added as a solvent to obtain a total of 100 wt % of composition 1.

Composition 2 (Pressure Sensitive Adhesive)

10 wt % of polyethylene glycol diacrylate [Mn 30,000] as an oligomer was added to 30 wt % of n-hexyl acrylate, 30 wt % of methyl methacrylate, 10 wt % of 4-hydroxybutyl acrylate, 10 wt % of 2-ethylhexyl acrylate, and 10 wt % of n-butyl acrylate, which are monomers, to prepare composition 2.

Composition 3

6.88 wt % of 4-hydroxybutyl acrylate as the first crosslinkable monomer; 53.83 wt % of 2-ethylhexyl acrylate as the second crosslinkable monomer; 14.75 wt % of tetrahydrofurfuryl acrylate as the third crosslinkable monomer; 11.55 wt % of 2-ethylhexyldiglycol acrylate as the fourth crosslinkable monomer; and 2.95 wt % of a first polypropylene glycol I (Mn 10,000, Tg=−44° C.) and 2.95 wt % of a second polypropylene glycol (Mn 35,000, Tg=−43° C.), which are oligomers; 0.1 wt % of γ-glycidoxypropyltriethoxysilane as a silane coupling agent; and 0.01 wt % of ethyl(2,4,6-trimethylbenzoyl)phenylphosphinate as a photoinitiator were mixed, and methylene chloride as a solvent was added thereto to prepare Composition 3 having the total amount of 100 wt %.

Composition 4

Composition 4 was prepared in the same manner as used to prepare Composition 3, except that (tetrahydro-2H-pyran-2-yl)methyl acrylate was used instead of tetrahydrofurfuryl acrylate as the third crosslinkable monomer.

Composition 5 Composition 5 was prepared in the same manner as used to prepare Composition 3, except that (7-oxa-bicyclo[2.2.1]heptan-2-yl)methyl acrylate was used instead of tetrahydrofurfuryl acrylate as the third crosslinkable monomer.

Composition 6

Composition 6 was prepared in the same manner as used to prepare Composition 3, except that γ-glycidoxypropylmethyldimethoxysilane was used instead of γ-glycidoxypropyltriethoxysilane as a silane coupling agent.

Composition 7

Composition 7 was prepared in the same manner as in Composition 3, except that no silane coupling agent was used.

Composition Viscosity Evaluation

The viscosity of each of compositions 1 and 3 to 7 was measured by using a sine-wave vibro viscometer (SV-1A, AND Co.), and within the range of 12 to 32 centipoise (cP). Each of the compositions did not have any observed problem in terms of ejection properties for use in an inkjet printer.

Modulus Evaluation

Comparative Example 1

Composition 1 was coated on a first release paper film to a thickness of 500 micrometers (μm), and another release paper film was adhered to the first release paper to form a film/composition/film structure. Then, the composition was cured with UV (365 $nm_{max}$) to prepare a polymer film.

Example 1

A polymer film was prepared in the same manner as in Comparative Example 1, except that Composition 3 was used.

Example 2

A polymer film was prepared in the same manner as in Comparative Example 1, except that Composition 4 was used.

Example 3

A polymer film was prepared in the same manner as in Comparative Example 1, except that Composition 5 was used.

Example 4

A polymer film was prepared in the same manner as in Comparative Example 1, except that Composition 6 was used.

The cured polymer films were cut using a hole punch with a diameter of 8 mm to prepare a sample for evaluation. The modulus was measured using a rheometer (Rheometer: DHR3, TA instruments). The modulus of the polymer film according to temperature was measured. Results thereof are shown in Table 1.

TABLE 1

| | Modulus (G') (MPa) | | |
|---|---|---|---|
| | @ 20° C. | @ 25° C. | @ 60° C. |
| Comparative Example 1 | 0.198 | 0.046 | 0.023 |
| Example 1 | 0.099 | 0.035 | 0.039 |
| Example 2 | 0.110 | 0.047 | 0.049 |
| Example 3 | 0.101 | 0.055 | 0.047 |
| Example 4 | 0.120 | 0.071 | 0.065 |

Peel Strength Measurement

Example 5

Composition 3 was coated on a first release paper film to a thickness of 50 μm, and another release paper film was adhered to the first release paper to form a film/composition/film structure. Then, the composition was cured with UV (365 $nm_{max}$) to prepare a polymer film.

Comparative Example 2

Composition 7 was coated on a first release paper film to a thickness of 50 μm, and another release paper film was adhered to the first release paper film to form a film/composition/film structure. Then, the composition was cured with UV (365 $nm_{max}$) to prepare a polymer film.

The cured polymer film was cut to a width of 25 mm and left at a temperature of 60° C. with the relative humidity of 93% for 30 minutes and 4 hours, and then peel strength was measured at room temperature and 60° C. Peel strength was measured by UTM (Instron Corporation).

Table 2 shows the peel strength values of the polymer film according to temperature.

TABLE 2

| Standing time at 60° C. and RH93%[1)] | Peel test conditions | Example 5 (gram-force) | Comparative Example 2 (gram-force) |
|---|---|---|---|
| 30 minutes | room temperature | 611 gf (n = 5 σ = 2) | 353 gf (n = 5 σ = 3) |
| | 60° C. | 495 gf (n = 5 σ = 1) | 182 gf (n = 5 σ = 1) |
| 4 hours | 60° C. | 529 gf (n = 3 σ = 1) | 118 gf (n = 3 σ = 2) |

RH93% indicates the relative humidity of 93%.

RH93% indicates the relative humidity of 93%.

In Table 2, the reported peel strength values are average values, n is the number of specimens, and σ is the standard deviation.

Referring to Table 2, it can be seen that Comparative Example 2 not including the silane coupling agent had a lower peel strength value than Example 5 including the silane coupling agent.

Repetitive Creep/Recovery Test

Comparative Example 3

Composition 1 was coated on a first release paper film to a thickness of 50 μm, and another release paper film was adhered to the first release paper film to form a film/composition/film structure. Then, the composition was cured with UV (365 $nm_{max}$) to prepare a polymer film.

Example 6

Composition 3 was coated on a first release paper film to a thickness of 50 μm, and another release paper film was adhered to the first release paper film to form a film/composition/film structure. Then, the composition was cured with UV (365 $nm_{max}$) to prepare a polymer film.

The cured polymer films were cut using an 8 mm diameter hole punch to prepare a sample for evaluation.

The sample was subjected to a shear force of 2000 Pa at −20° C., 25° C., and at 60° C. for 1 second and then recovered for 1 second, for a total of 300 times over 600 seconds, and then the strain was measured. The repeated creep/recovery test was measured using a rheometer (DHR3, TA instruments). The measured strain is shown in Table 3.

TABLE 3

| Temperature | Comparative Example 3 (prepared using composition 1) | Example 6 (prepared using Composition 3) |
|---|---|---|
| −20° C. | 5.7% | 3.1% |
| 25° C. | 3.8% | 0.5% |
| 60° C. | 0.4% | 0.1% |

Reliability Evaluation

Comparative Example 4

Composition 1 was applied to the window of a foldable display by inkjet having a thickness of 50 μm, crosslinked with UV (365 $nm_{max}$) for 1 second, and then a lower film was adhered to the crosslinked polymer film to prepare a foldable display window/polymer film/lower film structure. The foldable display window/polymer film/lower film was further crosslinked by exposure to UV (365 $nm_{max}$) for 2 seconds to adhere the foldable display window and the lower film to each other.

The foldable display window/polymer film/lower film structure was subjected to a folding test that included a folding/unfolding of 30,000 times at −20° C.

Example 7

After adhering the foldable display window and the lower film to each other as in Comparative Example 4 using Composition 3, the foldable display window/polymer film/lower film structure was subjected to a folding test that included a folding/unfolding of 30,000 times at −20° C.

Comparative Example 5

A foldable display window/polymer film/lower film structure was prepared by adhering a foldable display window and a lower film to the upper and lower portions of the 50 μm-thick film laminated with Composition 2. The foldable display window/polymer film/lower film was further crosslinked by exposure to UV (365 nm max) for 2 seconds to adhere the foldable display window to the lower film. The foldable display window/polymer film/lower film structure was subjected to a folding test that included a folding/unfolding of 30,000 times at −20° C.

Comparative Example 6

After adhering the foldable display window and the lower film to each other as in Comparative Example 4 using Composition 1, the foldable display window/polymer film/lower film structure was subjected to a folding test that included a folding/unfolding of 70,000 times at 60° C. and RH93%.

Example 8

After adhering the foldable display window and the lower film to each other as in Comparative Example 4 using Composition 3, the foldable display window/polymer film/lower film structure was subjected to a folding test that included a folding/unfolding of 70,000 times at 6° C. and RH93%.

Comparative Example 7

After adhering the foldable display window and the lower film to each other as in Comparative Example 5 using Composition 2, the foldable display window/polymer film/lower film structure was subjected to a folding test that included a folding/unfolding of 70,000 times at 60° C. and RH93%.

The folding test results are shown in Table 4.

TABLE 4

| Condition | | Quantity | Inspection cycle | Result |
|---|---|---|---|---|
| −20° C. folding | Comparative Example 4 | 3 | 30,000 times | crack, peel |
| | Example 7 | 3 | | Good |
| | Comparative Example 5 | 2 | | Good |
| 60° C. and RH93% folding | Comparative Example 6 | 3 | 70,000 times | crack |
| | Example 8 | 3 | | Good |
| | Comparative Example 7 | 2 | | bubble generation |

RH93% indicates the relative humidity of 93%.

From the results of Table 4, it can be seen that the window/polymer film/lower film structure of Examples 7 and 8 have greater reliability than the window/polymer film/lower film structure of Comparative Examples 4. and 6 and 7, respectively.

These results are also consistent with the results in Table 1, showing that the −20° C. modulus value of the polymer formed by crosslinking of the composition is 0.13 Megapascals (MPa) or less.

In addition, these results are also consistent with the results in Table 3, showing the strain measurement results of the repeated creep/recovery test of the crosslinked polymer described herein at a temperature of −20° C. and 60° C.

An electronic apparatus including a window/polymer film/lower film structure may be manufactured by applying the window/polymer film/lower film structure to an electronic apparatus including a light-emitting device, for example, a foldable display.

The composition according to an embodiment can be easily applied by inkjet, so that a polymer film of any shape can be manufactured, and there is no need to cut the polymer film in advance into a desired shape.

In addition, the polymer film prepared by curing the composition shows excellent performance in a high temperature and high humidity environment. Accordingly, the polymer is suitable for a foldable display.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A composition comprising:

a first monomer including a hydroxy group, wherein the first monomer is present from 5 wt % to 15 wt %, a second monomer that does not include a hydroxy group, a third monomer including a terminal heterocyclic group, a fourth monomer including an alkylene glycol, an oligomer, a silane coupling agent, and a photoinitiator, wherein the composition has a viscosity of 5 centipoise to 50 centipoise at about room temperature as determined with a sine-wave vibro viscometer, wherein the oligomer comprises a first polypropylene glycol and a second polypropylene glycol, and a weight average molecular weight of the first polypropylene glycol is less than a weight average molecular weight of the second polypropylene glycol, the weight average molecular weight of the first polypropylene glycol is from 5,000 g/mol to 20,000 g/mol, and the weight average molecular weight of the second polypropylene glycol is from 21,000 g/mol to 37,000 g/mol.

2. The composition of claim 1, wherein the first monomer and/or the second monomer is a (meth)acrylate-containing monomer.

3. The composition of claim 1, wherein the first monomer comprises 4-hydroxybutyl(meth)acrylate, 2-hydroxypropyl (meth)acrylate, 2-hydroxyethyl(meth)acrylate, dihydroxyhexyl(meth)acrylate, or any combination thereof.

4. The composition of claim 1, wherein the second monomer comprises 2-ethylhexyl(meth)acrylate, ethyl (meth)acrylate, methyl(meth)acrylate, n-propyl(meth)acrylate, isopropyl(meth)acrylate, pentyl(meth)acrylate, n-octyl (meth)acrylate, isooctyl(meth)acrylate, isononyl(meth) acrylate, n-butyl(meth)acrylate, isobutyl(meth)acrylate, n-hexyl(meth)acrylate, n-nonyl(meth)acrylate, isoamyl (meth)acrylate, n-decyl(meth)acrylate, isodecyl(meth)acrylate, dodecyl(meth)acrylate, isobornyl(meth)acrylate, cyclohexyl(meth)acrylate, phenyl(meth)acrylate, benzyl(meth) acrylate, isostearyl(meth)acrylate, 2-methylbutyl(meth) acrylate, or any combination thereof.

5. The composition of claim 1, wherein the third monomer and/or the fourth monomer is a (meth)acrylate-containing monomer.

6. The composition of claim 1, wherein the third monomer comprises tetrahydrofurfuryl(meth)acrylate, (tetrahydro-2H-pyran-2-yl)methyl(meth)acrylate[(tetrahydro -2H-pyran-2-yl)methyl(meth)acrylate], (oxetan-2-yl)methyl (meth)acrylate[(oxetan-2-y1)methyl(meth)acrylate], (oxepan-2-yl)methyl(meth))acrylate[(oxepan-2-yl)methyl (meth)acrylate], (2-oxa-bicyclo[2.2.2]octan-6-yl)methyl (meth)acrylate[(2-oxa -bicyclo [2.2.2]octan-6-yl)methyl (meth)acrylate], (7-oxa-bicyclo[2.2.1]heptan-2-y1)methyl (meth)acrylate, [(7-oxa-bicyclo[2.2.1]heptan-2-yl)methyl (meth)acrylate], or any combination thereof.

7. The composition of claim 1, wherein the fourth monomer comprises 2-ethylhexyldiglycol(meth)acrylate, ethyleneglycol(meth)acrylate, propyleneglycol(meth)acrylate, or any combination thereof.

8. The composition of claim 1, wherein a weight ratio of the first polypropylene glycol to the second polypropylene glycol is 1:9 to 9:1.

9. The composition of claim 8, wherein the weight average ratio of the first polypropylene glycol to the second polypropylene glycol is 3:7 to 7:3.

10. The composition of claim 8, wherein the weight ratio of the first polypropylene glycol to the second polypropylene glycol is 4:6 to 6:4.

11. The composition of claim 1, wherein the silane coupling agent comprises γ-glycidoxypropyltriethoxysilane, γ-glycidoxypropyltrimethoxysilane, γ-glycidoxypropylmethyldiethoxysilane, γ-glycidoxypropylmethyl dimethoxysilane, 3-chloropropyltrimethoxysilane, 3-chloropropyltriethoxysilane, 2-chloroethyltrimethoxysilane, 2-chloroethyltriethoxysilane, y-methacryloxypropyl trimethoxysilane, γ-methacryloxypropyl methyldimethoxysilane, γ-methacryloxypropyl dimethylmethoxysilane, or any combination thereof.

12. The composition of claim 1, wherein the photoinitiator comprises 4-acryloxybenzophenone, 2,2-dimethoxy-2-phenylacetophenone, 2-hydroxy-2-methyl-1-phenyl -1-propan-1-one, ethyl(2,4,6-trimethylbenzoyl)phenyl phosphinate [ethyl(2,4,6-trimethylbenzoyl)phosphinate], bisacylphosphine oxide [bisacylphosphine oxide], or any combination thereof.

13. The composition of claim 1, wherein the second monomer is present from 45 wt % to 65 wt %, based on the total content of the composition.

14. The composition of claim 13, wherein the third monomer is present from 10 wt % to 20 wt %, the fourth monomer is present from 5 wt % to 15 wt %, the oligomer is present from 2 wt % to 30 wt %, the silane coupling agent is present from 0.1 wt % to 1 wt %, and the photoinitiator is present from 0.001 wt % to 0.05 wt %, based on the total content of the composition.

15. A composition comprising:

a first monomer including 4-hydroxybutyl(meth)acrylate, 2-hydroxypropyl (meth)acrylate, 2-hydroxyethyl (meth)acrylate, dihydroxyhexyl(meth)acrylate, or any combination thereof, wherein the first monomer is present from 5 wt % to 15 wt %;

a second monomer 2-ethylhexyl(meth)acrylate, ethyl (meth)acrylate, methyl(meth)acrylate, n-propyl(meth) acrylate, isopropyl(meth)acrylate, pentyl(meth)acrylate, n-octyl(meth)acrylate, isooctyl(meth)acrylate, isononyl(meth)acrylate, n-butyl(meth)acrylate, isobutyl(meth)acrylate, n-hexyl(meth)acrylate, n-nonyl (meth)acrylate, isoamyl(meth)acrylate, n-decyl(meth) acrylate, isodecyl(meth)acrylate, dodecyl(meth)acrylate, isobornyl(meth)acrylate, cyclohexyl(meth) acrylate, phenyl(meth)acrylate, benzyl(meth)acrylate, isostearyl(meth)acrylate, 2-methylbutyl(meth)acrylate, or any combination thereof, a third monomer including a terminal heterocyclic group, a fourth monomer including an alkylene glycol, and a first polypropylene glycol and a second polypropylene glycol with a different weight average molecular weight, the weight average molecular weight of the first polypropylene glycol is from 5,000 g/mol to 20,000 g/mol, and the weight average molecular weight of the second polypropylene glycol is 21,000 g/mol to 37,000 g/mol, wherein the composition has a viscosity of 5 centipoise to 50 centipoise at about room temperature as determined with a sine-wave vibro viscometer.

16. The composition of claim 15, wherein the second monomer is present from 45 wt % to 65 wt %, the third monomer is present from 10 wt % to 20 wt %, the fourth monomer is present from 5 wt % to 15 wt %, and the first polypropylene glycol and the second polypropylene glycol is collectively present from 2 wt % to 30 wt %.

17. The composition of claim 16, further comprising a silane coupling agent and a photoinitiator.

* * * * *